Nov. 9, 1965 A. ALFORD 3,217,274
IMPEDANCE MATCHING BALUN HAVING QUARTER WAVELENGTH CONDUCTORS
Filed Jan. 16, 1961 4 Sheets-Sheet 1
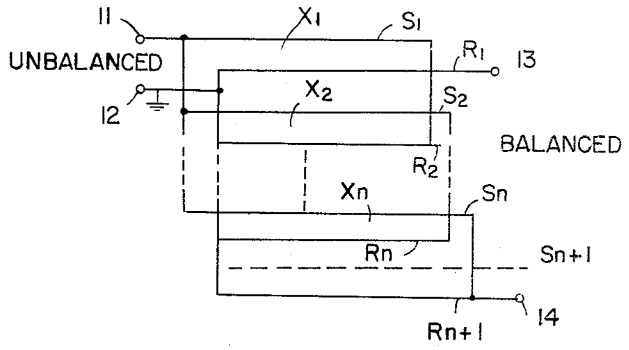
FIG. 1
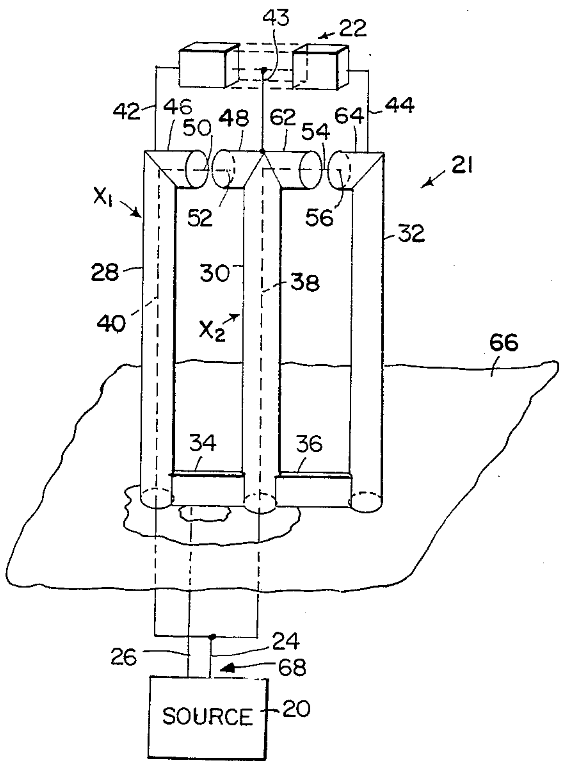
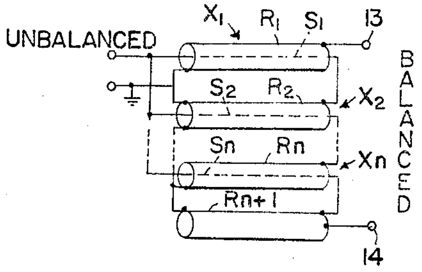
FIG. 2
FIG. 3
*INVENTOR.*
ANDREW ALFORD
*BY*
Ezekiel Wolf, Wolf & Greenfield
ATTORNEYS Nov. 9, 1965 A. ALFORD 3,217,274

IMPEDANCE MATCHING BALUN HAVING QUARTER WAVELENGTH CONDUCTORS

Filed Jan. 16, 1961 4 Sheets-Sheet 2

INVENTOR.
ANDREW ALFORD
BY
Ezekiel Wolf, Wolf & Greenfield
ATTORNEYS

IMPEDANCE MATCHING BALUN HAVING QUARTER WAVELENGTH CONDUCTORS

Filed Jan. 16, 1961 4 Sheets-Sheet 3

*INVENTOR.*
ANDREW ALFORD
*BY*
*Ezekiel Wolf, Wolf & Greenfield*
ATTORNEYS

Nov. 9, 1965 A. ALFORD 3,217,274

IMPEDANCE MATCHING BALUN HAVING QUARTER WAVELENGTH CONDUCTORS

Filed Jan. 16, 1961 4 Sheets-Sheet 4

INVENTOR.
ANDREW ALFORD
BY
Ezekiel Wolf, Wolf & Greenfield
ATTORNEYS

United States Patent Office 3,217,274

Patented Nov. 9, 1965

3,217,274

IMPEDANCE MATCHING BALUN HAVING QUARTER WAVELENGTH CONDUCTORS

Andrew Alford, 299 Atlantic Ave., Winchester, Mass.

Filed Jan. 16, 1961, Ser. No. 82,794

6 Claims. (Cl. 333—26)

The present invention relates in general to converting a signal from one form to another and more particularly concerns a novel balun operative over a wide frequency range and capable of matching an impedance at the unbalanced input to a different impedance at the balanced output. The invention is especially useful for intercoupling a coaxial line and the balanced input of a dipole antenna.

It is an important object of this invention to provide means for translating a signal between balanced and unbalanced form on balanced and unbalanced terminal pairs, respectively.

It is an object of the invention to achieve the preceding object while matching the impedance level on the balanced input terminal pair to that on the unbalanced terminal pair.

It is still another object of the invention to achieve the preceding objects over a wide frequency range.

It is a further object of the invention to achieve the above objects with compact apparatus relatively easy to fabricate.

According to the invention, at least two transmission lines each having a signal conductor and a reference conductor comprise means for intercoupling an unbalanced terminal pair and a balanced terminal pair. Each of the reference and signal conductors extends from its unbalanced end near the unbalanced terminal pair to its balanced end near the balanced terminal pair. Another reference conductor extends from its unbalanced end near the unbalanced terminal pair to its balanced end near the balanced terminal pair. Means are provided to couple each unbalanced reference conductor end to the ground terminal of the unbalanced terminal pair and maintain the latter unbalanced ends substantially at ground potential.

Each signal conductor balanced end is coupled to an immediately adjacent reference conductor balanced end. The terminals of the balanced terminal pair are respectively coupled to the balanced end of said another reference conductor and the balanced end of the reference conductor of a first of the transmission lines.

Numerous other features, objects and advantages of the invention will become apparent from the following specification when read in connection with the accompanying drawing in which:

FIG. 1 is a schematic representation of a generalized balun according to the invention;

FIG. 2 is a schematic representation of a generalized balun comprising coaxial transmission lines according to the invention;

FIG. 3 is a pictorial representation of a two transmission line balun according to the invention;

Figures 4, 5, 11:
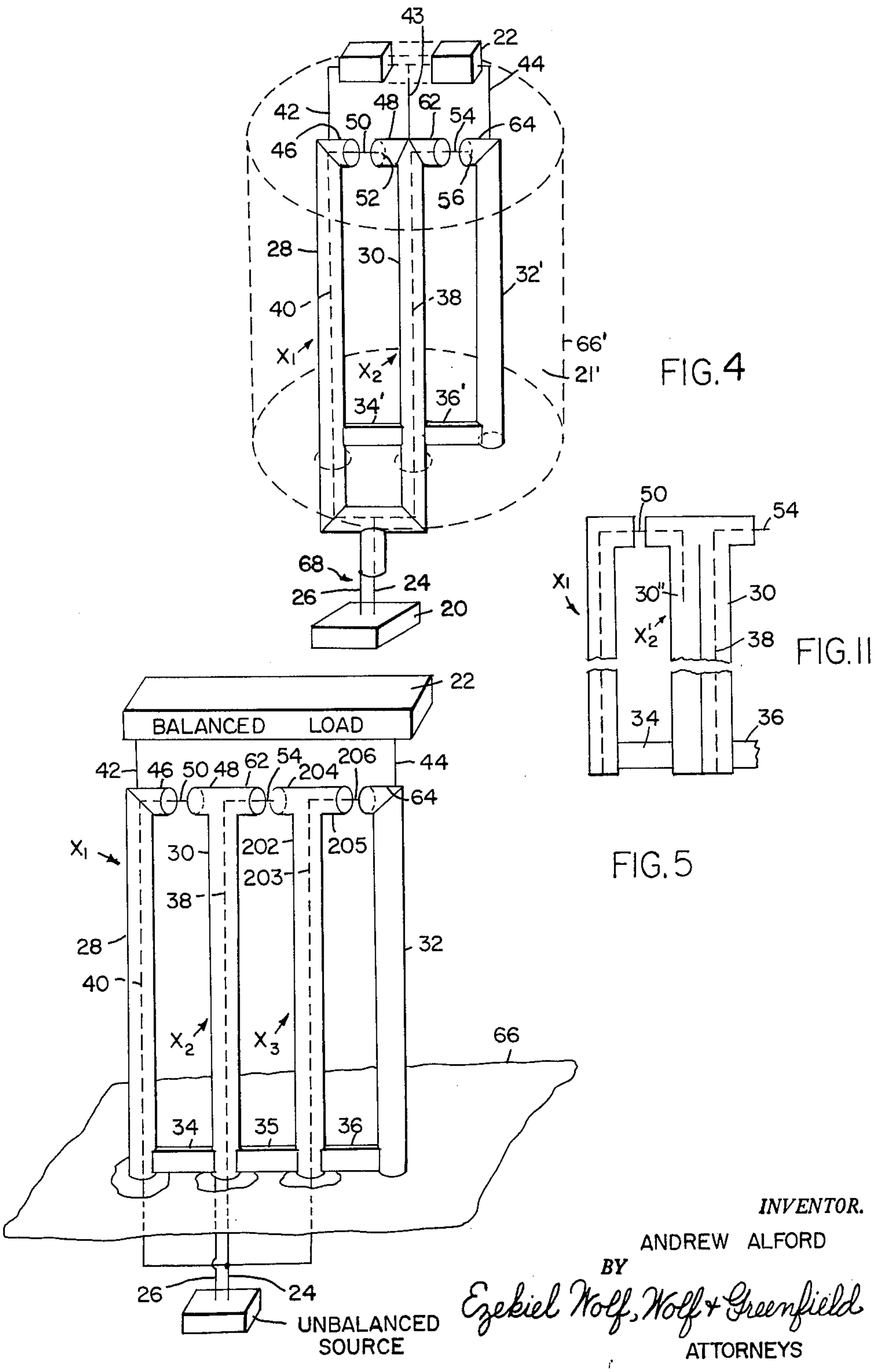
FIG. 4 is a modification of the embodiment shown in FIG. 3.
FIG. 5 is a balun according to the invention having three coaxial transmission lines.
FIG. 11 shows a detail for modifying the structures of FIGS. 3–5 to extend the frequency range.

With reference now to the drawing and more particularly FIG. 1 thereof, there is illustrated a schematic representation of a balun according to the invention. An input signal applied between the unbalanced input consisting of signal terminal 11 and grounded terminal 12 is converted to a balanced signal developed between terminals 13 and 14 which form a balanced terminal pair. The balanced terminal pair and unbalanced terminal pair are intercoupled by means including a plurality of transmission lines designated $X_1$, $X_2$ . . . $X_n$. Each of these transmission lines has a signal conductor, designated S with an appropriate subscript, and a reference conductor, designated R with an appropriate subscript. In addition, there is another reference conductor $R_{n+1}$, adjacent to the reference conductor $R_n$. Another signal conductor, designated $S_{n+1}$ may be associated with the reference conductor $R_{n+1}$. This signal conductor, if present, may be floating and is indicated by a broken line in FIG. 1.

All the ends of the signal conductors, $S_1$—$S_n$, are coupled to the signal terminal 11 at their unbalanced ends, that is, the ends nearest the unbalanced terminal pair so that the potential on the latter terminal is applied at these ends. The reference conductors $R_1$—$R_{n+1}$ are all coupled to the ground terminal 12 at their unbalanced ends so that these unbalanced ends are maintained substantially at a common potential, such as ground potential. The balanced ends, that is, the ends nearest the balanced terminal pair of the extreme reference conductors $R_1$ and $R_{n+1}$ are coupled to terminals 13 and 14, respectively, so that the potentials on the latter balanced ends are the same as on the respective terminals. The remaining reference conductor balanced ends are coupled to the balanced end of a signal conductor of an immediately preceding transmission line by suitable coupling means which may be a direct or reactive coupling link. Thus, the balanced end of signal conductor $S_1$ is coupled to the balanced end of reference conductor $R_2$. The structure schematically represented in FIG. 1 will convert an unbalanced signal applied between terminals 11 and 12 into a balanced signal between terminals 13 and 14 and vice-versa.

Preferably, the length of each transmission line comprising the means intercoupling the unbalanced and balanced terminal pairs is a quarter wavelength at the center frequency of the operating band. The input impedance seen at the unbalanced input is that of $n$ transmission lines in parallel, while that seen between the balanced input terminal pair is the impedance of $n$ transmission lines in series when the respective terminal pairs are terminated in these respective input impedances. Thus, the invention effects balun operation and impedance transformation over a wide range of frequencies with a compact structure.

Referring to FIG. 2, there is shown a schematic representation of a generalized balun according to the invention comprising coaxial transmission lines. The reference symbols used in FIG. 1 identify corresponding elements in FIG. 2 and the discussion above of the system of FIG. 1 is applicable to the system shown in FIG. 2.

With reference now to FIG. 3, there is shown a pictorial representation of a system according to the invention in which a source of high frequency energy 20 is coupled by an unbalanced transmission line comprising a signal conductor 24 and a reference conductor 26 and the novel balun 21 to a diagrammatically represented balanced load 22, such as a balanced dipole antenna.

Since reference conductor 26 is normally at ground potential, the signal potential on signal conductor 24 is converted to potentials of equal magnitude but opposite sense on conductors 42 and 44 with respect to ground potential.

The balun 21 includes two loops comprising three reference conductors 28, 30 and 32 intercoupled at their ends nearest the unbalanced input by cross conductors 34 and 36, conductor 30 being common to both loops. Conductors 42 and 44 of the balanced transmission line are connected to the balanced ends of conductors 28 and 32, respectively. If desired, a conductor 43 may be connected at a point of symmetry on conductor 30 near the balanced input at a point maintained substantially at ground potential.

Signal conductor 40 is coaxially aligned within and insulatedly separated from outer reference conductor 28. The unbalanced and balanced ends of signal conductor 40 are respectively connected to signal conductor 24 and to the balanced input end of conductor 30 by a gap conductor 50. Similarly, signal conductor 38 is coaxially aligned within and insulatedly separated from reference conductor 30 and connected between signal conductor 24 and the balanced input end of reference conductor 32 at 56 by a gap conductor 54. Reference conductor 26 is preferably symmetrically connected to reference conductors 28, 30 and 32 through means including the cross conductors 34 and 36. Using wide bars for cross conductors 34 and 36 minimizes the flow of unbalanced ground currents and lessens the need for the latter connection being at a point of symmetry of the three reference conductors.

To minimize unbalance at the balanced input, a number of structural features are present. A conducting shield 66 may be provided oriented generally perpendicular to the plane formed by the conductors 28, 30 and 32. In addition, the gap conductors 50 and 54 are preferably almost entirely coaxially surrounded by reference conductor extension 46 of conductor 28, and extension 62 of conductor 30. Extension 48 of conductor 30 and extension 64 of conductor 32 serve to cancel the unbalance which may be introduced by extensions 46 and 62 of conductors 28 and 30, respectively.

The width of the gap between extensions 46 and 48 and the gap between extensions 62 and 64 is preferably sufficiently small so that coupling between the gap conductors 50 and 54 to surfaces at ground potential is negligible. For an operating wavelength of 30 inches, a gap width of ⅛″, of the order of .004 wavelength has been found to be satisfactory.

Referring to FIG. 4, there is shown a modification of the embodiment of FIG. 3 in which a generally cylindrical shielding surface 66′, represented by dotted lines, surrounds the coupling device 21′ which is in substance the structure of FIG. 3 with conductor 32 shortened and represented as 32′ in FIG. 4, its unbalanced end being coupled to points on reference conductors 28 and 30 by cross conductors 34′ and 36′ in contact with the base of the shield 66′. Corresponding elements in FIGS. 3 and 4 are identified by the same reference symbol and the discussion of FIG. 3 above is applicable to the correspondingly identified elements in FIG. 4.

As stated above, an important feature of the present invention resides not only in intercoupling balanced and unbalanced inputs, but also in matching the impedance presented at one of the inputs to that presented at the other over a wide frequency range. For example, a typical unbalanced transmission line has a characteristic impedance of the order of 50 ohms while a balanced device, such as a folded dipole antenna presents an input impedance of 300 ohms.

It has been discovered that if $n$ transmission lines of equal characteristic impedance cooperate with the additional reference conductor $R_{n+1}$ according to the invention, the impedance presented at the balanced input is $n^2$ times that presented at the unbalanced input if the characteristic impedance of each of the transmission lines $X_1$—$X_n$ is selected to be $n$ times larger than that impedance presented between the terminals of the unbalanced input. For example, in the structures of FIGS. 3 and 4 the transmission lines $X_1$ and $X_n$ are preferably selected to have a characteristic impedance of 100 ohms to match a 50 ohm impedance applied at the balanced input to a 200 ohm impedance applied to the unbalanced input.

Referirng to FIG. 5, there is shown another variation of the structure shown in FIG. 3 having three coaxial transmission lines $X_1$—$X_3$ so that the effective impedance presented between the balanced input terminals is nine times that presented between the unbalanced input terminal. The general rule seems to be that the impedance presented at the unbalanced input is the impedance presented by the $n$ transmission lines in parallel while that presented between the balanced input terminals is the impedance presented by the $n$ transmission lines in series. Thus, if the characteristic impedance of all of the lines are equal and the balanced and unbalanced inputs properly terminated, the impedance matched at the unbalanced input $Z_0/n$ and that the balanced input $nZ_0$.

In the structure of FIG. 5, the additional line $X_3$ includes an outer reference conductor 202, an inner signal conductor 203, and extension 204 of outer conductor 202 to which gap conductor 54 is connected, and another extension 205 of outer conductor 202 which surrounds a third gap conductor 206 which connects the balanced end of center conductor 203 to the extension 64 of the reference conductor 32. An additional cross conductor 36 connects the unbalanced end of outer conductor 202 to the unbalanced end of reference conductor 32. If the characteristic impedance of each of lines $X_1$—$X_3$ is 150 ohms, the balun matches an unbalanced input impedance of 50 ohms to a balanced impedance of 450 ohms.

Figure 6:
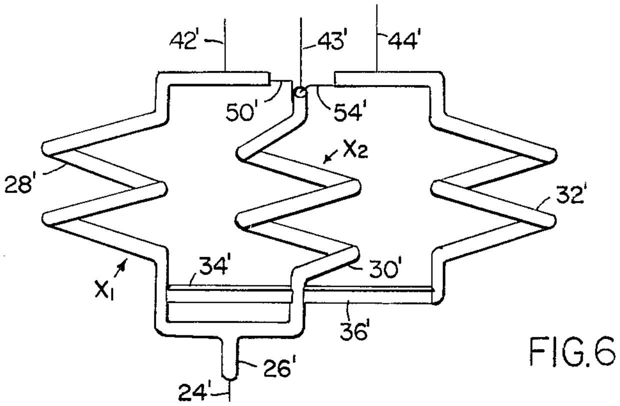
FIG. 6 is a pictorial representation of a preferred embodiment of the invention using compactly arranged helical coaxial transmission lines.

Referring to FIG. 6, there is shown still another embodiment of the invention in which the coaxial transmission lines $X_1$ and $X_2$ are shown coiled in the same sense about spaced parallel axes while the additional reference conductor 32′ is coiled about a third axis spaced from and parallel to the other two in opposite sense. The same reference numerals identify corresponding elements in FIGS. 3 and 6, with an appended prime being added to the reference numerals in FIG. 6.

Figure 7:
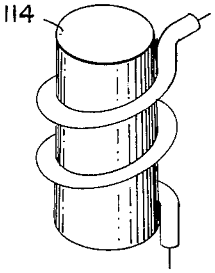
FIG. 7 illustrates a detail of a helical coaxial transmission line wound upon a magnetic core.
Figure 8:
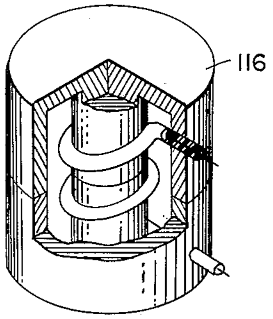
FIG. 8 is a cutaway view of a helical coaxial transmission line fully enclosed by a pair of cup-shaped magnetic cores.

Referring to FIG. 7, there is illustrated a detail wherein a coiled coaxial transmission line is shown wound upon a core 114 of magnetically permeable material and FIG. 8 shows a toroidal magnetic core 116 formed by like cup-shaped halves for completely surrounding the coiled conductors. The purpose of coiling the transmission lines and surrounding them with material of high magnetic premeability is to increase the effective impedance of the lines which shunt the gaps. The result of this is to markedly increase the effective bandwidth for obtaining both the function of a balun and impedance matching. Preferably, the effective electrical length of the transmission lines is a quarter wavelength at the center of the operating band. That is, the delay furnished by a line corresponds to a quarter period at the center frequency.

Figure 9:
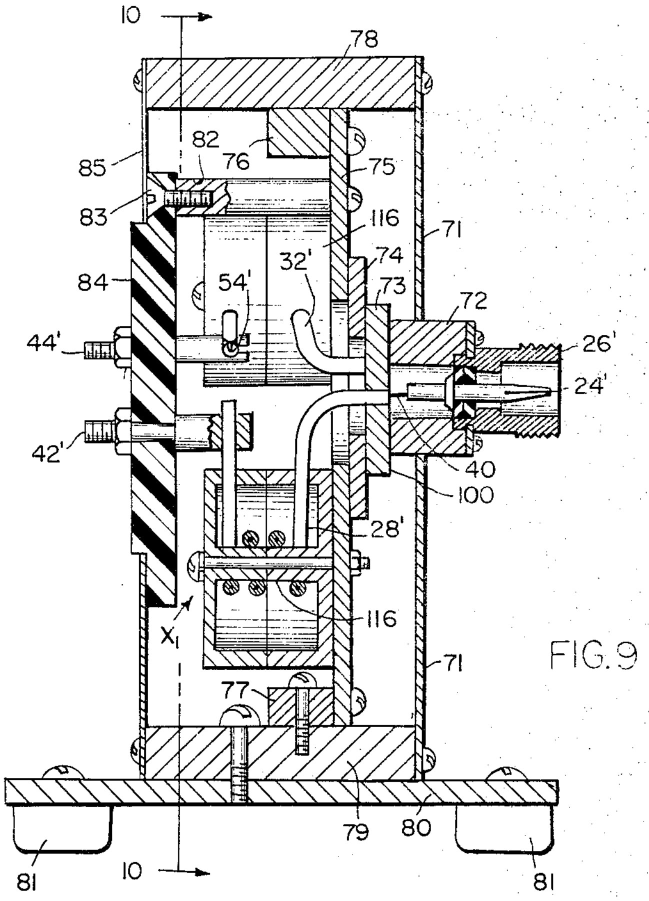
FIGS. 9 and 10 show the physical arrangement of the balun schematically represented in FIG. 6.
Figure 10:
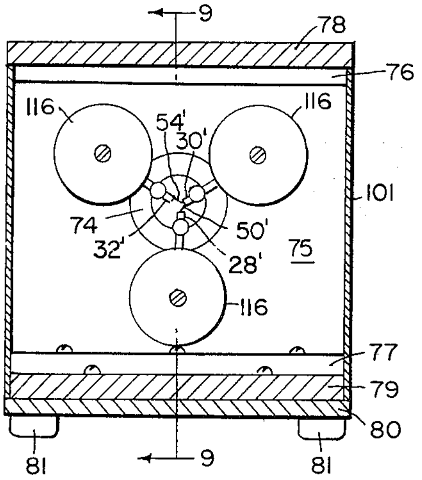

In a preferred embodiment of the invention, the structure of FIG. 6 is arranged as shown in the side sectional views of FIGS. 9 and 10. The entire assembly is completely enclosed in a conductive shielding 101 fitted with suitable openings for bringing out the balanced and unbalanced inputs.

Referring to FIG. 9, the side-sectional view through section 9—9 of the side sectional view shown in FIG. 10 best illustrates details of a specific embodiment according to the invention. The unbalanced input protrudes from a front plate 71 with signal conductor 24′ and reference conductor 26′ comprising a conventional coaxial input jack secured to a toroidal conducting block 72 supported within front plate 71 and surrounding the connection between signal conductor 24' and the center conductor 40' of transmission line $X_1$. The inside face of toroidal conducting block 72 contacts a conducting disc 73 in which reference conductors 32', 28' and 30' (not shown in FIG. 9) are embedded and conductively interconnected thereby at their unbalanced ends. The latter three reference conductors pass through an annular conducting ring 74 and a conducting base plate 75 to which the transmission lines $X_1$ and $X_2$ and the core-enclosed reference conductor 32' are secured by suitable means, such as brass bolts coaxial about the axes of the cores 116.

Right angle bracing blocks 76 and 77 are secured in respective corners between base plate 75 and top conducting block 78 and bottom conducting block 79, respectively, to insure mechanical stability. Bottom conducting plate 79 in turn rests upon a lower base plate 80 which is supported by rubber feet 81.

A threaded binding post 82 is fastened to base plate 75 and serves to accommodate a flat head screw 83 which helps hold the shouldered disc-like insulating wafer 84 in place, back plate 85 being formed with an opening which snugly engages the shoulder of insulator 84 as shown and is fastened to upper conducting block 78 and lower conducting block 79.

The insulator 84 supports the balanced terminals 42' and 44' which are connected to the balanced ends of reference conductors 50' and 32' as shown.

There has been described a novel balun operative over a wide frequency range and adaptable for effecting an impedance match between considerably different balanced and unbalanced impedances. Yet, the structure is compact and relatively easy and inexpensive to fabricate. While the device has been described as useful for coupling an unbalanced transmission line to a balanced antenna, the invention is also useful in coupling a balanced high impedance source to a low impedance unbalanced transmission line. For example, a push-pull power amplifier stage presenting a relatively high impedance may be used to directly drive the balanced input and the unbalanced input coupled to a low impedance unbalanced transmission line.

It was stated above that reactive or direct coupling means could be used for intercoupling the different conductors. The specific embodiments shown in FIGS. 3–5, for example, show the balanced ends of signal conductors directly coupled to reference conductor balanced ends. Referring to FIG. 11 there is shown a modification of these structures to illustrate a preferred form of reactive coupling which further improves operating characteristics. Note that transmission line $X_2'$ is substituted for transmission line $X_2$, the latter being modified by placing another hollow conducting tube 30'' immediately adjacent to reference conductor 30 and extending linking conductor 50 inside conducting tube 30'' to effectively form an open-circuited coaxial transmission line across the gap traversed by conductor 50. This adds effective capacitive reactance across this gap which tends to tune out the inductance introduced across the gap by the loop formed by adjacent reference conductors and the conducting bands intercoupling adjacent unbalanced ends of the reference conductors.

It is evident that those skilled in the art may now make numerous other modifications of, departures from and uses of the specific embodiments described herein without departing from the inventive concept. Consequently, the invention is to be construed as limited only by the spirit and scope of the appended claims.

What is claimed is:

1. Apparatus for translating a signal between balanced and unbalanced forms comprising, an unbalanced terminal pair having a first terminal maintained at reference potential and a second terminal capable of following signal potential, a balanced terminal pair having third and fourth terminals capable of developing oppositely sensed potentials with respect to said reference potential, a first plurality of at least three shielding conductors each having an unbalanced end near said unbalanced terminal pair and a balanced end near said balanced terminal pair, means for coupling the unbalanced end of each of said shielding conductors to said first terminal to maintain said unbalanced ends at substantially said reference potential, a second plurality one less than said first plurality of signal conductors each having an unbalanced end near said unbalanced terminal pair and a balanced end near said balanced terminal pair to form with respective ones of said shielding conductors that number of parallel conductor transmission lines equal to said second plurality, means for coupling the unbalanced end of each of said signal conductors to said second terminal to maintain each of the latter unbalanced ends and said second terminal at substantially the same potential, means for coupling each balanced end of said signal conductors to the balanced end of an immediately adjacent shielding conductor, thereby leaving one of said transmission line shielding conductor balanced ends capable of assuming a potential different from that on any of said other conductor balanced ends, means for coupling the balanced end of the remaining shielding conductor to said third terminal to maintain the latter end and said third terminal at substantially the same potential, and means for coupling said one shielding conductor balanced end to said fourth terminal to maintain the latter end and said fourth terminal at substantially the same potential, the unbalanced ends of adjacent ones of said shielding conductors being located close together to define a plurality of gaps one less than the number of said shielding conductors which gaps are coupled in series across said third and fourth terminals, said transmission lines and said remaining shielding conductor comprising a plurality of loops one less than the number of said shielding conductors.

2. Apparatus in accordance with claim 1 wherein said parallel conductor transmission lines are coaxial transmission lines, said signal and said shielding conductors of each line being the inner and outer conductors respectively of a coaxial transmission line.

3. Apparatus in accordance with claim 2 wherein the effective electrical length of said transmission lines corresponds to a quarter wavelength at a frequency within the band where said apparatus converts balanced and unbalance signals from one form to the other.

4. Apparatus for translating a signal between balanced and unbalanced forms comprising, an unbalanced terminal pair having a first terminal maintained at ground potential and a second terminal capable of following signal potential, an unbalanced terminal pair having third and fourth terminals capable of developing oppositely sensed potentials with respect to ground potential, a plurality of at least two generally parallel transmission lines located between said terminal pairs and each having a signal conductor and a reference conductor with each signal and reference conductor having an unbalanced end near said unbalanced input terminal pair and a balanced end near said balanced terminal pair, a reference conductor beside and generally parallel to one of said transmission lines and having an unbalanced end near said unbalanced input terminal pair and a balanced end near said balanced terminal pair, means for coupling all said reference conductor unbalanced ends to said first terminal to maintain said unbalanced ends nearly at ground potential, means for coupling all of said signal conductors to said second terminal to maintain said signal conductor unbalanced ends and said second terminal at substantially the same potential, means for coupling the balanced end of said another reference conductor to said third terminal to maintain the latter balanced end and said third terminal at substantially the same potential, means for coupling the balanced end of the reference conductor of one of said transmission lines to said fourth terminal to maintain the latter other end and said fourth terminal at substantially the same potential, and means for intercoupling the remaining balanced ends of signal and reference conductors to present the impedances of said transmission lines in parallel between said unbalanced terminal pair and in series between said balanced terminal pair, the unbalanced ends of adjacent ones of said shielding conductors being located close together to define a plurality of gaps one less than the number of said shielding conductors which gaps are coupled in series across said third and fourth terminals, said transmission lines and said remaining shielding conductor comprising a plurality of loops one less than the number of said shielding conductors.

5. Apparatus for converting balanced and unbalanced signals from one form to the other within a range of frequencies including a center frequency comprising, a balanced terminal pair, an unbalanced terminal pair, a plurality of at least two transmission lines extending from an unbalanced end near said unbalanced terminal pair to a balanced end near said balanced terminal pair, each of said transmission lines having a signal conductor with its unbalanced end coupled to one of the unbalanced terminals and a reference conductor with its unbalanced end coupled to the other of said unbalanced terminals, another reference conductor extending from said balanced terminal pair to said unbalanced terminal pair, means including said reference conductors defining a number of loops equal to said plurality, each of said loops including a narrow gap insulatedly separating one reference conductor balanced end from the balanced end of an adjacent reference conductor, said gaps being located near said balanced terminal pair, and means coupling the terminals of said balanced pair in series with said insulating gaps, the effective electrical length of each of said transmission lines corresponding to a quarter wavelength at said center frequency, said signal and reference conductors of said transmission lines being inner and outer conductors respectively of coaxial transmission lines, said signal conductors and said reference conductors forming helices about generally parallel axes, the sense of winding of said another conductor about its parallel axis being opposite to that of the remaining conductors about their parallel axes.

6. Apparatus for translating signals between balanced and unbalanced forms on a balanced branch and an unbalanced branch respectively comprising, said balanced branch, said unbalanced branch, at least first and second transmission lines and another conductor, means for delivering power received at said unbalanced branch in parallel over said first and second transmission lines to develop a first potential across a first gap defined by said first and second transmission lines and develop a second potential across a second gap defined by said another conductor and said second transmission line, means including said first and second transmission lines defining a first loop, means including said second transmission line and said another conductor defining a second loop, and means for coupling the series combination comprising said first and second gaps across said balanced branch, said transmission lines being coaxial and each comprising inner and outer conductors, said first gap being defined by closely spaced opposed ends of the outer conductors of said first and second transmission lines, said second gap being defined by closely spaced opposed ends of said second transmission line outer conductor and said another conductor, said first transmission line inner conductor and said second transmission line outer conductor comprising said first loop, said second transmission line inner conductor and said another conductor comprising said second loop.

References Cited by the Examiner

UNITED STATES PATENTS

| | | | |
|---|---|---|---|
| 2,013,140 | 9/35 | Friis | 333—25 |
| 2,925,566 | 2/60 | Jasik | 333—26 |
| 2,950,449 | 8/60 | Alford | 333—26 |
| 3,025,480 | 3/62 | Guanella | 333—26 |

FOREIGN PATENTS

| | | |
|---|---|---|
| 1,231,183 | 4/60 | France. |

HERMAN K. SAALBACH, *Primary Examiner.*

RUDOLPH V. ROLINEC, *Examiner.*